(12) United States Patent
Boren

(10) Patent No.: US 7,558,031 B2
(45) Date of Patent: Jul. 7, 2009

(54) INTELLIGENT AUTOMATIC BYPASS FOR A MOTOR CONTROL DEVICE

(75) Inventor: Steven G. Boren, Glen Carbon, IL (US)

(73) Assignee: ABB Inc., Norwalk, CT (US)

( * ) Notice: Subject to any disclaimer, the term of this patent is extended or adjusted under 35 U.S.C. 154(b) by 1185 days.

(21) Appl. No.: 10/836,357

(22) Filed: Apr. 30, 2004

(65) Prior Publication Data

US 2004/0252423 A1 Dec. 16, 2004

Related U.S. Application Data

(60) Provisional application No. 60/467,353, filed on May 2, 2003.

(51) Int. Cl.
*H02H 7/08* (2006.01)
(52) U.S. Cl. ....................................... 361/23
(58) Field of Classification Search ................... 361/23
See application file for complete search history.

(56) References Cited

U.S. PATENT DOCUMENTS 3,914,675 A * 10/1975 Konrad ...................... 318/453
5,057,962 A * 10/1991 Alley et al. ..................... 361/24
5,179,842 A * 1/1993 Kanazawa ..................... 62/158
5,285,029 A * 2/1994 Araki ........................ 187/290
6,316,896 B1 * 11/2001 Tikkanen et al. ............. 318/446
6,522,944 B2 * 2/2003 Wielebski et al. ........... 700/224
2002/0079862 A1 * 6/2002 Shepeck et al. ............. 318/778
2003/0048006 A1 * 3/2003 Shelter et al. ................. 307/64

FOREIGN PATENT DOCUMENTS

CA 2481614 * 3/2005

* cited by examiner

*Primary Examiner*—Stephen W Jackson
*Assistant Examiner*—Ann T Hoang
(74) *Attorney, Agent, or Firm*—Michael M. Rickin; Paul R. Katterle

(57) ABSTRACT

An intelligent automatic bypass for a motor control device determines if a fault that is occurring is a restricted or non-restricted fault. A restricted fault is one that may damage or destroy the motor if an automatic switch to bypass is allowed to occur for all faults. The intelligent automatic bypass allows the automatic switch to bypass only if the fault is a non-restricted fault and blocks the automatic switch to bypass if the fault is a restricted fault.

6 Claims, 2 Drawing Sheets

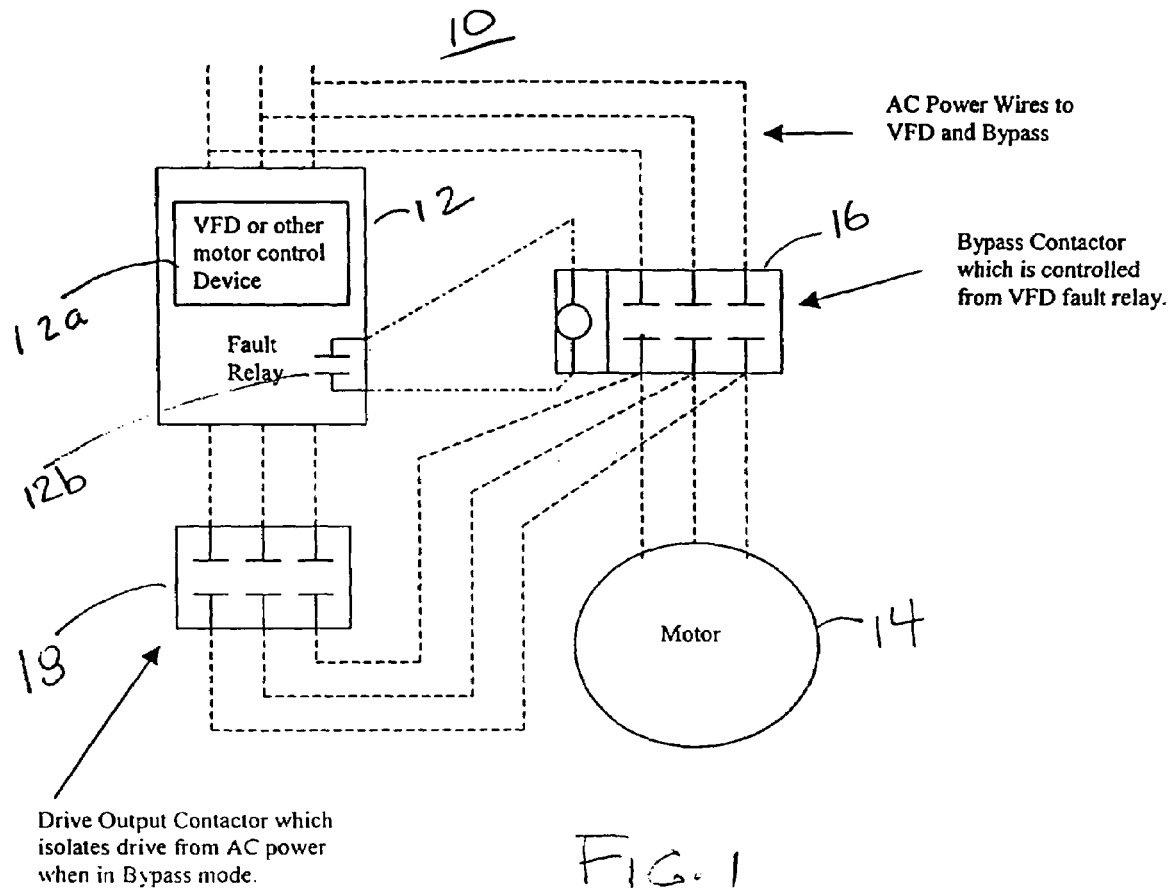

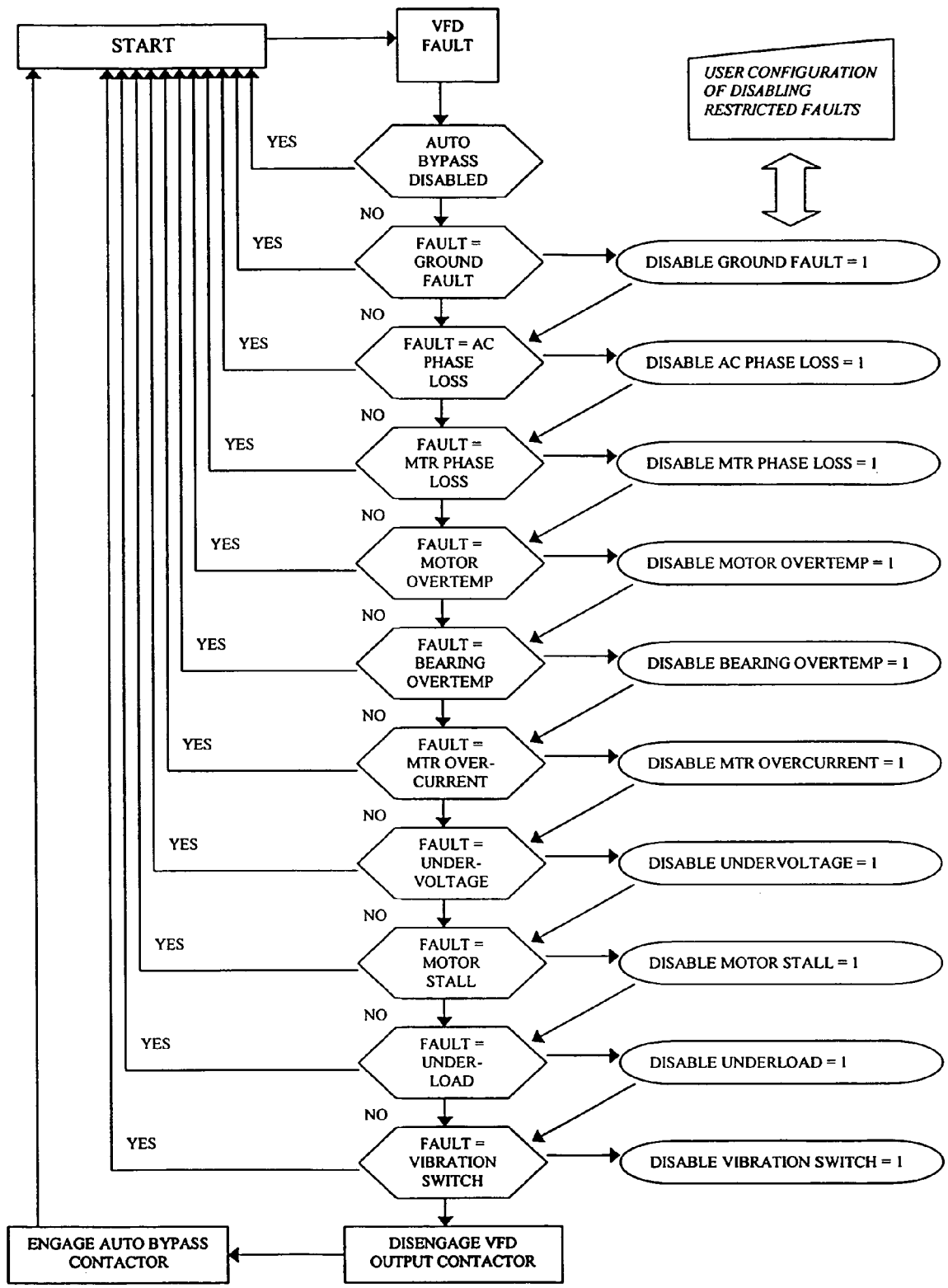

INTELLIGENT AUTOMATIC BYPASS FOR A MOTOR CONTROL DEVICE

CROSS REFERENCE TO RELATED APPLICATION

This application claims the priority of U.S. provisional patent application Ser. No. 60/467,353 filed on May 2, 2003, entitled "Intelligent Automatic Bypass For A Variable Frequency Drive (VFD) Fault" the contents of which are relied upon and incorporated herein by reference in their entirety, and the benefit of priority under 35 U.S.C. 119(e) is hereby claimed.

FIELD OF THE INVENTION

This invention relates to motor control devices such as variable frequency drives (VFDs) and more particularly to the switching of the VFD to a bypass contactor in the event of a fault.

DESCRIPTION OF THE PRIOR ART

A-C motors are used in many applications including heating, ventilation, and air conditioning (HVAC) and also to drive pumps and fans. The HVAC applications include driving fans that provide ventilation and air handling including air conditioning in facilities such as laboratories, semiconductor manufacturing facilities and hospital operating rooms. Other example applications include driving pumps that provide service water to a hospital or office building.

Typically, in critical applications such as those described above, the A-C motor is driven by a automatic bypass control system that is connected between the source of A-C power and the motor. The automatic bypass control system includes a VFD that is used to provide power to the motor and control the speed thereof based on specific process requirements. Therefore, the device driven by the motor, such as the fan in an air handling or ventilation system or a pump in a water supply system, provides either needed air flow or air exchange or water at a rate that is based on user requirements.

The A-C source is connected to the VFD in the automatic bypass control system and is also connected through a normally open contactor, known as the bypass contactor, to the motor. The VFD is connected to the motor through a contactor known as the drive output contactor. Under normal conditions the VFD controls the speed of the motor and the bypass contactor is open and the drive contactor is closed.

Upon a malfunction the automatic bypass control system automatically opens the drive output contactor and closes the bypass contactor to thereby keep the motor connected to the source of A-C power and to continue operation. The drive output contactor must be opened when closing the bypass contactor so that AC power is not fed into the output of the VFD causing damage. With automatic transfer to bypass operation, the motor continues to drive the fan of the air handling unit or ventilation system or the pump of the service water system even if the fan or pump is running at full speed instead of at a speed based on user requirements.

The automatic switch to bypass described above guarantees no down time and no interruption of service for systems such as service water to a hospital or AC in a semiconductor manufacturing facility. The downside of this automatic switch to bypass is that in some cases the fault that has caused the VFD to malfunction may also destroy the motor if the automatic switch to bypass occurs.

The faults, referred to hereinafter as restricted faults, that may also destroy the motor if the automatic switch to bypass occurs include but are not limited to a ground fault on the motor leads, incoming power phase loss, motor cable phase loss, motor overtemperature, motor bearing overtemperature, gearbox overtemperature, Overcurrent (Motor Current exceeded an internal protection limit), motor stall (jam protection), underload (broken drive train on the output of the motor shaft), vibration switch (cooling towers, pumps, and fans have mechanical vibration switches to shut the unit down if it becomes unbalanced), undervoltage (AC power has dipped to a level that trips the drive and would thus require excessive current to run the motor which would burn up the motor).

Therefore, there is a need for an intelligent automatic bypass that allows the automatic switch to bypass only upon the occurrence of general non-restricted faults, that is, faults that are not threatening to the motor, fusing, automatic bypass hardware such as the contactors, or the mechanical system that is being controlled such as a fan or pump. If a restricted fault occurs, the switch to bypass is blocked so that more severe motor damage is avoided.

SUMMARY OF THE INVENTION

A system for controlling an AC motor comprising:

a motor controller comprising a motor control device and means for identifying an occurring fault and determining if said occurring fault is either a non-restricted fault or a restricted fault;

an output contactor connected between said motor control device and said motor, said output contactor closed in the absence of any occurring fault; and a bypass contactor connected to said motor control device and connected also between a source of AC power, and said AC motor, said bypass contactor open in the absence of any occurring fault;

said motor controller first opening said output contactor upon said fault identifying means determining the occurrence of either a non-restricted fault or a restricted fault and then closing said bypass contactor only when said fault identifying means determine the occurrence of a non-restricted fault.

A method for controlling an AC motor by a motor control device upon the occurrence of a fault, said motor control device connected to said AC motor by an output contactor, said output contactor closed when said AC motor is operating in the absence of any occurring fault, and a bypass contactor connected to said motor control device and connected also between a source of AC power and said AC motor, said bypass contactor open when said motor is operating in the absence of any occurring fault, said method comprising:

determining the occurrence of either a non-restricted fault or a restricted fault; and opening said output contactor and then closing said bypass contactor only upon the determination of a non-restricted fault.

A controller for an AC motor, said controller intermediate between a source of AC power and said AC motor, comprising:

means for determining the occurrence of a fault;

means for identifying said determined fault occurrence either as a non-restricted fault or as a restricted fault; and means for first causing said AC motor to be disconnected from said motor controller when either a non-restricted fault or a restricted fault occurs and then causing said motor to be connected to said source of AC power through a bypass contactor only when said identified occurring fault is a non-restrictive fault.

DESCRIPTION OF THE DRAWING

FIG. 1 shows a block diagram of a system that includes the intelligent automatic bypass of the present invention.

FIG. 2 shows a flowchart for the program that makes decisions what faults will allow the automatic switch to bypass.

DESCRIPTION OF THE PREFERRED EMBODIMENT(s)

Referring now to FIG. 1, there is shown in block diagram form a system 10 with an intelligent automatic bypass upon the occurrence of a fault. System 10 includes a motor controller 12 that is used to drive a motor 14. The controller includes a VFD 12a and a VFD fault relay 12b. The motor controller 12 is connected to a source (not shown) of AC power. System 10 further includes a bypass contactor 16 which is also connected to the source of AC power. The bypass contactor 16 is controlled by the VFD fault relay 12b.

System 10 also includes a drive output contactor 18 which is connected to controller 12 and bypass contactor 16. Drive Output Contactor 18 isolates the VFD 12a from the AC power source when system 10 is in the bypass mode. While controller 12 includes In the embodiment shown in FIG. 1 a VFD 12a, it should be appreciated any other motor control device may be used in controller 12.

The present invention is a VFD program (see the flowchart for the program shown in FIG. 2) which is resident in VFD 12a, or any other controlling device such as a computer or PLC (Programmable Logic Controller) program (connected to VFD 12a but not shown in FIG. 1), that makes "intelligent" decisions on what faults created will allow the automatic switch to bypass mode and what faults will not allow the bypass contactors 16 to be engaged. When the VFD 12a, or other motor controlling device, detects a warning or faulted state, the condition that triggered this fault state is first identified. If the identified fault is a restricted fault, then the controlling device does not engage the bypass contactor 16.

By blocking the automatic switch to the bypass contactor mode of operation when the identified fault is a restricted fault, destruction of the motor 14, cabling, fusing, or other mechanical devices will be avoided. When general non-restricted faults are identified, the drive output contactor 18 is disengaged, and the bypass contactor 16 is engaged allowing the motor 14 to run at full speed. Presently, the common practice in the industry is to allow the motor 14 to operate at full speed in the event of any fault when utilizing a automatic bypass control system.

Restricted faults may be selectable by the operator with any type of programming interface or DIP Switches. In the embodiment described herein, the operator of the VFD system 10 uses the VFD control keypad to "Enable" the restricted faults from a list present within the VFD firmware to thereby not allow the automatic transfer to the bypass contactor when such a fault occurs. In other words, the operator of the VFD system 10 will decide what faults are "Restricted Faults" and what faults are treated as "General Non-restricted Faults" that allow an automatic bypass to occur. Restricted faults may be either selectable as previously described, or fixed (otherwise known as hard-coded logic) so that the operator can not disable the restricted faults from protecting the control system.

Once the restricted faults are identified by the operator or hard-coded in the control program, they are used to compare to any active fault that occurs in the controlling device. If the active fault matches a restricted fault, then the automatic switch to bypass is blocked from occurring. If the active fault does not match a fault on the restricted fault list, then the controlling device, VFD 12a in the embodiment shown in FIG. 1, triggers an automatic switch to the Bypass Contactor 16 by energizing the contactor coil which in this embodiment is performed by the output of the VFD fault relay 12b, and the VFD Output Contactor 18 is disengaged.

Restricted faults consist of, but are not limited to, the following fault conditions: Supply Power Phase Loss, Motor Cable Phase Loss, Ground Faults, Motor Overtemperature, Motor Bearing Overtemperature, Gearbox Overtemperature, Overcurrent (Motor Current exceeded an internal protection limit), Undervoltage (low voltage on incoming power), Vibration Switch located on the mechanical device that VFD 12a is controlling, Motor Stall (mechanical bind or jam, not allowing motor to freely rotate), and a Underload (broken shaft or belt so motor is no longer driving the load).

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A system for controlling an AC motor comprising:
    a motor controller comprising a motor control device and means for identifying an occurring fault and determining if said occurring fault is either a non-restricted fault or a restricted fault;
    an output contactor connected between said motor control device and said motor, said output contactor closed in the absence of any occurring fault; and
    a bypass contactor connected to said motor control device and connected also between a source of AC power and said AC motor, said bypass contactor open in the absence of any occurring fault;
    said motor controller first opening said output contactor upon said fault identifying means determining the occurrence of either a non-restricted fault or a restricted fault and then closing said bypass contactor only when said fault identifying means determine the occurrence of a non-restricted fault.

2. The system of claim 1 wherein said motor controller further comprises a bypass contactor controlling device and said bypass contactor controlling device in response to said fault identifying means determining the occurrence of a non-restricted fault closing said bypass contactor after said output contactor is opened.

3. The system of claim 2 wherein said bypass contactor controlling device is a relay.

4. The system of claim 1 wherein said motor control device is a variable frequency drive.

5. A method for controlling an AC motor by a motor control device upon the occurrence of a fault, said motor control device connected to said AC motor by an output contactor, said output contactor closed when said AC motor is operating in the absence of any occurring fault, and a bypass contactor connected to said motor control device and connected also between a source of AC power and said AC motor, said bypass contactor open when said motor is operating in the absence of any occurring fault, said method comprising:

determining the occurrence of either a non-restricted fault or a restricted fault; and opening said output contactor and then closing said bypass contactor only upon the determination of a non-restricted fault.

6. A controller for an AC motor, said controller intermediate between a source of AC power and said AC motor, comprising:

means for determining the occurrence of a fault;

means for identifying said determined fault occurrence either as a non-restricted fault or as a restricted fault; and means for first causing said AC motor to be disconnected from said motor controller when either a non-restricted fault or a restricted fault occurs and then causing said motor to be connected to said source of AC power through a bypass contactor only when said identified occurring fault is a non-restrictive fault.

* * * * *